United States Patent
Mizuno et al.

(10) Patent No.: US 10,839,623 B2
(45) Date of Patent: Nov. 17, 2020

(54) VEHICLE, IMAGE DISPLAY DEVICE, VEHICLE CONTROL METHOD, AND IMAGE DISPLAY METHOD

(71) Applicant: HONDA MOTOR CO., LTD., Tokyo (JP)

(72) Inventors: Kunihiro Mizuno, Niiza (JP); Shiro Fukano, Shiki (JP)

(73) Assignee: HONDA MOTOR CO., LTD., Tokyo (JP)

( * ) Notice: Subject to any disclaimer, the term of this patent is extended or adjusted under 35 U.S.C. 154(b) by 34 days.

(21) Appl. No.: 15/381,770

(22) Filed: Dec. 16, 2016

(65) Prior Publication Data

US 2017/0249789 A1  Aug. 31, 2017

(30) Foreign Application Priority Data

Feb. 29, 2016  (JP) .................................. 2016-038291

(51) Int. Cl.
| | |
|---|---|
| G07C 5/08 | (2006.01) |
| G07C 5/00 | (2006.01) |
| B60C 23/02 | (2006.01) |
| B60R 21/013 | (2006.01) |
| G01C 21/36 | (2006.01) |
| B60R 21/01 | (2006.01) |

(52) U.S. Cl.
CPC ............ *G07C 5/0825* (2013.01); *B60C 23/02* (2013.01); *B60R 21/013* (2013.01); *G01C 21/3661* (2013.01); *G07C 5/008* (2013.01); *G07C 5/0808* (2013.01); *G07C 5/0858* (2013.01); *B60R 2021/01095* (2013.01)

(58) Field of Classification Search
CPC .. G07C 5/0825; G07C 5/0808; G07C 5/0858; G07C 5/008; B60R 21/013; B60R 2021/01095; B60C 23/02; G01C 21/3661
See application file for complete search history.

(56) References Cited

U.S. PATENT DOCUMENTS 6,087,929 A * 7/2000 Charzinski ............... B60Q 9/00
                                                            340/439
2006/0238321 A1* 10/2006 Chen ..................... B60R 25/257
                                                            340/438

(Continued)

FOREIGN PATENT DOCUMENTS

| EP | 2557432 A1 | 2/2013 |
|---|---|---|
| JP | 2005-283325 A | 10/2005 |

(Continued)

OTHER PUBLICATIONS

European Search Report, EP Application No. 17150684.3 dated Jan. 24, 2018, 13 pages.

(Continued)

*Primary Examiner* — James J Yang
(74) *Attorney, Agent, or Firm* — Rankin, Hill & Clark LLP

(57) ABSTRACT

A vehicle includes a detection unit configured to detect a state of the vehicle, a transmission unit configured to transmit information based on a result of the detection performed by the detection unit to an image display device, and a control unit configured to change information to be transmitted to the image display device when a power supply of the vehicle has changed from an on state to an off state.

5 Claims, 9 Drawing Sheets

(56) References Cited

U.S. PATENT DOCUMENTS

| | | | |
|---|---|---|---|
| 2010/0106345 A1 | 4/2010 | Hwang et al. | |
| 2014/0195108 A1* | 7/2014 | Schumacher | G06F 17/00 |
| | | | 701/36 |
| 2015/0138070 A1 | 5/2015 | Iwatsu | |
| 2015/0154816 A1 | 6/2015 | Chen et al. | |
| 2015/0187146 A1 | 7/2015 | Chen et al. | |

FOREIGN PATENT DOCUMENTS

| | | |
|---|---|---|
| JP | 2006-293789 A | 10/2006 |
| JP | 2013-037501 A | 2/2013 |
| JP | 2014-120095 A | 6/2014 |
| WO | 2013/074866 A1 | 5/2013 |
| WO | 2014/047695 A2 | 4/2014 |
| WO | 2014/128809 | 8/2014 |

OTHER PUBLICATIONS

Japanese Office Action from JP Application No. 2016-038291 dated Oct. 3, 2017, with English Translation, 8 pages.
European Search Report, dated Jul. 28, 2017, 12 pages.

\* cited by examiner

VEHICLE, IMAGE DISPLAY DEVICE, VEHICLE CONTROL METHOD, AND IMAGE DISPLAY METHOD

CROSS-REFERENCE TO RELATED APPLICATION

Priority is claimed on Japanese Patent Application No. 2016-038291, filed Feb. 29, 2016, the content of which is incorporated herein by reference.

BACKGROUND OF THE INVENTION

Field of the Invention

The present invention relates to a vehicle, an image display device, a vehicle control method, and an image display method.

Description of Related Art

Recently, image display devices which are mounted on a head portion for use have been developed. These image display devices are of a non-transparent type that blocks vision and a transparent type that does not block vision. With the non-transparent type, only an image is displayed on a display unit. Thus, a user can view only the image. In the transparent type, a display unit is, for example, a half-mirror. Thus, the user can view the appearance of an external world and an image.

As disclosed in PCT International Publication No. WO2014/128809 (hereinafter, Patent Literature 1), a sensor provided in a rim part of a transparent head-mounted display detects a contact operation or a proximity operation of a hand of a user and therefore a display state of an image is changed. Here, the change in the display state of the image is enhancement of an image, enlargement of an image, enhancement of a contrast of an image, a change in color of an image, further enhancement of an image having higher priority than that of an image having lower priority among a plurality of images to which priorities are assigned, an increase in an information amount of an image, a decrease in visible light transmittance, shielding of visible light, or the like.

Recently, a process of acquiring information from a vehicle and displaying the acquired information using such an image display device has been required. Also, information from the vehicle is, for example, navigation information, information of a vehicle speed, or the like.

SUMMARY OF THE INVENTION

However, if technology disclosed in Patent Literature 1 is used in the image display device which displays information of a vehicle, it is possible to display an image during driving, but it is impossible to display the information of the vehicle even after a power supply of the vehicle is in an off state.

An aspect according to the present invention is made in view of the above-described circumstances and an objective of the present invention is to provide a vehicle, an image display device, a vehicle control method, and an image display method capable of displaying information of a vehicle even after a power supply of the vehicle is in the off state.

To achieve the above-described objective, the present invention adopts the following aspects.

<1> A vehicle according to an aspect of the present invention includes a detection unit configured to detect a state of the vehicle; a transmission unit configured to transmit information based on a result of the detection performed by the detection unit to an image display device; and a control unit configured to change information to be transmitted to the image display device when a power supply of the vehicle has changed from an on state to an off state.

<2> According to the above-described aspect <1>, the control unit may determine whether an abnormality has occurred in the vehicle using the detection result, and the transmission unit may transmit information indicating that an abnormality has occurred in the vehicle to the image display device when a determination result of the control unit indicates that the abnormality has occurred in the vehicle.

<3> According to the above-described aspect <1> or <2>, the detection unit may include a position detection unit configured to detect position information of the vehicle, and the control unit may transmit the position information detected by the position detection unit to the image display device via the transmission unit after the power supply of the vehicle changes from the on state to the off state.

<4> According to any one of the above-described aspects <1> to <3>, the vehicle may further include a timer unit configured to continue supply of power to the detection unit, the transmission unit, and the control unit for a predetermined time after the power supply of the vehicle changes from the on state to the off state, and the control unit may transmit the information to the image display device for a period in which the power is supplied from the timer unit after the power supply of the vehicle changes from the on state to the off state.

<5> According to any one of the above-described aspects <1> to <4>, the detection unit may include at least one of a tilt detection unit configured to detect tilt of the vehicle, a vibration/impact detection unit configured to detect vibration or an impact of the vehicle, a rotation angle detection unit configured to detect a rotation angle of the vehicle, a key detection unit configured to detect whether a key is stuck in the vehicle, an air pressure detection unit configured to detect an air pressure of a wheel tire in the vehicle, a remaining amount detection unit configured to detect a remaining amount of fuel or battery of the vehicle, and a cover opening/closing detection unit configured to detect an opened/closed state of a cover of a seat of the vehicle, and the control unit may determine whether an abnormality has occurred in the vehicle using at least one of results of the detections performed by the tilt detection unit, the vibration/impact detection unit, the rotation angle detection unit, the key detection unit, the air pressure detection unit, the remaining amount detection unit, and the cover opening/closing detection unit.

<6> According to any one of the above-described aspects <1> to <5>, the image display device may be at least one of a head-mounted display, a smartphone, a tablet terminal, and a portable game device, and the vehicle may include: a reception unit configured to receive a notification instruction transmitted by the vehicle; a notification unit; and a control unit configured to provide a notification from the notification unit according to the notification instruction received by the reception unit.

<7> An image display device according to an aspect of the present invention includes a display unit; a reception unit configured to receive information including position information of a vehicle received by the vehicle; a position detection unit configured to detect position information of an image display device; and a control unit configured to generate navigation information from a position of the image display device to a position of the vehicle using the position information of the vehicle received from the vehicle when the power supply of the vehicle is in the off state and the position information of the image display device detected by the position detection unit and display the generated navigation information on the display unit.

<8> According to the above-described aspect <7>, the control unit may provide a notification to the display unit on the basis of received information indicating that an abnormality has occurred in the vehicle when the information indicating that the abnormality has occurred in the vehicle is received via the reception unit and display the position information of the vehicle on the display unit.

<9> A vehicle control method according to an aspect of the present invention includes a detection procedure of detecting a state of a vehicle; a transmission procedure of transmitting information based on a result of the detection performed in the detection procedure to an image display device; and an image change procedure of changing information to be transmitted to the image display device when a power supply of the vehicle has changed from an on state to an off state.

<10> An image display method according to an aspect of the present invention is an image display method of an image display device including a display unit, the image display method including: a reception procedure of receiving information including position information of a vehicle received by the vehicle when a power supply of the vehicle is in an off state; a position detection procedure of detecting position information of an image display device; and a display procedure of generating navigation information from a position of the image display device to a position of the vehicle using the position information of the vehicle received from the vehicle and the position information of the image display device detected in the position detection procedure and displaying the generated navigation information on the display unit.

According to the above-described aspect <1>, <7>, <9>, or <10>, a convenient vehicle can be provided to a user because information of the vehicle can be provided to the user even in a state in which a power supply of the vehicle is turned off.

According to the above-described aspect <2> or <8>, a convenient vehicle can be provided to a user because it is possible to notify the user that an abnormality has occurred in the vehicle even in a state in which the power supply of the vehicle is turned off.

According to the above-described aspect <3>, it is possible to prevent the user from forgetting a parking position after parking because it is possible to guide the user to the location of a vehicle after the user turns off the power supply of the vehicle and gets out of the vehicle. Therefore, according to the above-described <3>, a convenient vehicle can be provided.

According to the above-described aspect <4>, power is supplied to each unit of the vehicle for a predetermined time after the power supply of the vehicle is turned off. Thereby, according to the above-described state <4>, a convenient vehicle can be provided to a user because information of the vehicle can be provided to the user even in a state in which the power supply of the vehicle is turned off and power consumption of the vehicle can be reduced.

According to the above-described aspect <5>, it is possible to quickly cope with an abnormality of the vehicle because it can be realized that there is an abnormality in the vehicle after parking. Therefore, according to the above-described aspect <5>, a convenient vehicle can be provided.

According to the above-described aspect <6>, it is possible to quickly cope with an abnormality of the vehicle because it can be realized that there is an abnormality in the vehicle through the image display device. Therefore, according to the above-described aspect <6>, a convenient vehicle can be provided.

DETAILED DESCRIPTION OF THE INVENTION

Hereinafter, embodiments of the present invention will be described with reference to the drawings.

First Embodiment

In the present embodiment, an example of an eyeglass type head-mounted display (hereinafter referred to as an HMD) serving as an image display device will be described.

Figure 1:
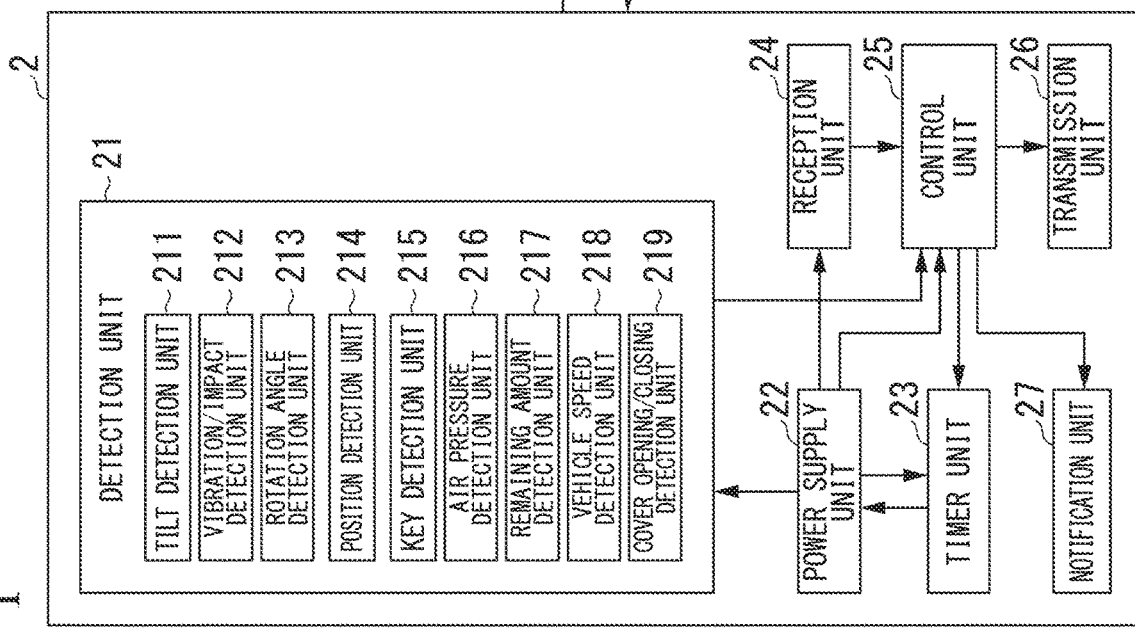
FIG. 1 is a block diagram illustrating a schematic configuration of a vehicle detection system according to a first embodiment.

FIG. 1 is a block diagram illustrating a schematic configuration of a vehicle detection system 1 according to the first embodiment.

As illustrated in FIG. 1, the vehicle detection system 1 includes a vehicle 2 and an HMD 3 (an image display device).

Also, the vehicle 2 and the HMD 3 perform communication using, for example, a short-range wireless communication standard. The short-range wireless communication standard is, for example, communication of a Bluetooth (registered trademark) low energy (LE) (hereinafter referred to as BLE) standard.

First, the vehicle 2 will be described.

The vehicle 2 includes a detection unit 21, a power supply unit 22, a timer unit 23, a reception unit 24, a control unit 25, a transmission unit 26, and a notification unit 27. Also, the detection unit 21 includes a tilt detection unit 211, a vibration/impact detection unit 212, a rotation angle detection unit 213, a position detection unit 214, a key detection unit 215, an air pressure detection unit 216, a remaining amount detection unit 217, a vehicle speed detection unit 218, and a cover opening/closing detection unit 219.

The vehicle 2 is, for example, a straddle-type vehicle such as an automatic two-wheeled vehicle. Also, the vehicle 2 may be a four-wheeled vehicle, an automatic three-wheeled vehicle, or the like. When the power supply is in the on state, the vehicle 2 transmits, for example, information indicating a vehicle speed and information indicating a current position to the HMD 3 by the transmission unit 26, among information detected by the detection unit 21. Also, when the power supply is in the off state, the vehicle 2 transmits information detected by the detection unit 21 to the HMD 3 by the transmission unit 26.

The detection unit 21 detects a state of the vehicle 2 and outputs information indicating the detected state to the control unit 25. Also, the detection unit 21 may additionally include a side lock detection unit which detects whether a side stand is locked, an infrared sensor which detects a state of the vehicle 2, or the like.

The tilt detection unit 211 is, for example, a three-axis acceleration sensor that detects tilt of the vehicle 2.

The tilt detection unit 211 detects tilt of the vehicle 2 on the basis of gravity acceleration and outputs information indicating the detected tilt to the control unit 25.

The vibration/impact detection unit 212 is a sensor which detects vibration or an impact and is, for example, an acceleration sensor, a piezoelectric sensor, or the like. The vibration/impact detection unit 212 detects the vibration or the impact of the vehicle 2 and outputs information indicating the detected vibration or impact to the control unit 25.

The rotation angle detection unit 213 is, for example, a gyro sensor that detects a rotation angle of the vehicle 2.

The rotation angle detection unit 213 outputs information indicating the detected rotation angle to the control unit 25.

The position detection unit 214 is, for example, a Global Positioning System (GPS) terminal that detects a current position of the vehicle 2. The position detection unit 214 outputs information indicating the detected current position as vehicle position information to the control unit 25.

The key detection unit 215 detects whether the power supply is in the on state and whether a key is inserted into a key cylinder. The key detection unit 215 outputs the detected key information indicating whether the power supply is in the on state and whether the key is in the inserted state to the control unit 25.

The air pressure detection unit 216 detects an air pressure of a wheel tire (a front wheel tire or a rear wheel tire). The air pressure detection unit 216 outputs information indicating the detected air pressure to the control unit 25. Also, the key detection unit 215 may be configured to detect whether a handlebar of the vehicle 2 is locked on the basis of an angle of a key.

The remaining amount detection unit 217 detects a remaining amount of fuel or battery which is a state of the vehicle 2. The remaining amount detection unit 217 outputs information indicating the detected remaining amount to the control unit 25.

The vehicle speed detection unit 218 detects a vehicle speed which is a state of the vehicle 2. The vehicle speed detection unit 218 outputs information indicating the detected vehicle speed as speed information to the control unit 25.

The cover opening/closing detection unit 219 detects, for example, opening/closing information of a cover of a container under a tandem seat. The cover opening/closing detection unit 219 outputs the detected opening information to the control unit 25.

The power supply unit 22 supplies power to the units (the detection unit 21, the timer unit 23, the reception unit 24, the control unit 25, the transmission unit 26, and the notification unit 27) of the vehicle 2 when the power supply is in the on state.

Even after the power supply is in the off state, the power supply unit 22 supplies power to the units (the detection unit 21, the timer unit 23, the reception unit 24, the control unit 25, the transmission unit 26, and the notification unit 27) of the vehicle 2 for a period in which the timer unit 23 outputs information indicating that a timer is in operation.

In addition, the power supply unit 22 is configured to supply power to an electric system for driving the vehicle 2 when the power supply is in the on state and is configured not to supply the power to the electric system for driving the vehicle 2 when the power supply is in the off state.

Furthermore, the on state and the off state of the power supply are switched by a power supply operation unit and the like (not shown).

When the control unit 25 has output a timer operation start instruction, the timer unit 23 starts the timer operation. The timer unit 23 outputs information indicating that the timer is in operation to the power supply unit 22 during the timer operation of a predetermined period. Specifically, the timer unit 23 starts the timer operation according to an instruction of the control unit 25 when the power supply is in the off state. Thereby, in the present embodiment, the supply of power from the power supply unit 22 to each unit is continued for a predetermined period set by the timer unit 23 after the power supply is in the off state.

The reception unit 24 includes a reception antenna, receives reception waves transmitted by the HMD 3, and converts the received reception waves into a received signal. The reception unit 24 outputs the received signal obtained through the conversion to the control unit 25.

Also, the received signal includes identification information of the HMD 3, a personal identification number necessary for pairing of BLE, etc. Also, the received signal includes a notification instruction transmitted by the HMD 3.

The control unit 25 determines whether the power supply is in the on state on the basis of key information output by the key detection unit 215. If it is determined that the power supply is in the on state, the control unit 25 generates a transmission signal using vehicle position information detected by the position detection unit 214, information indicating a remaining amount detected by the remaining amount detection unit 217, and speed information detected by the vehicle speed detection unit 218 and outputs the generated transmission signal to the transmission unit 26.

If it is determined that the power supply is in the off state, the control unit 25 outputs an instruction to start the timer operation to the timer unit 23. Also, if it is determined that the power supply is in the off state, the control unit 25 determines whether an abnormality has occurred in the vehicle 2 on the basis of information indicating tilt detected by the tilt detection unit 211, information indicating vibration or an impact detected by the vibration/impact detection unit 212, information indicating a rotation angle detected by the rotation angle detection unit 213, vehicle position information detected by the position detection unit 214, key information indicating whether a key detected by the key detection unit 215 is inserted, information indicating an air pressure detected by the air pressure detection unit 216, information indicating a remaining amount detected by the remaining amount detection unit 217, and information indicating opening/closing information detected by the cover opening/closing detection unit 219. If it is determined that the power supply is in the off state and if it is determined that an abnormality has occurred in the vehicle 2, the control unit 25 generates a transmission signal including notification information indicating the abnormality and vehicle position information and outputs the generated transmission signal to the transmission unit 26. If it is determined that the power supply is in the off state and if it is determined that no abnormality has occurred in the vehicle 2, the control unit 25 generates a transmission signal including the vehicle position information and outputs the generated transmission signal to the transmission unit 26.

Also, abnormalities that may occur in the vehicle 2 include, for example, forgetting to remove a key, forgetting to lock handlebars, a state in which a remaining amount of a fuel or voltage of a battery of the vehicle 2 is less than or equal to a threshold value, a state in which an air pressure of the wheel tire is less than or equal to a threshold value, a state in which the vehicle 2 has moved from a parking position, a state in which a cover of a container of the vehicle 2 is open, a state in which the tilt of the vehicle 2 has changed to a predetermined value or more during parking, a state in which vibration or an impact is applied to the vehicle 2, a state in which a rotation angle of the vehicle 2 has changed to a predetermined value or more during parking, or the like.

The transmission unit 26 includes a transmission antenna, converts a transmission signal output by the control unit 25 into transmission waves, and transmits the converted transmission signal from the transmission antenna to the HMD 3. Also, the transmission signal includes each detection value detected by the detection unit 21 and notification information indicating a possibility of occurrence of the off state of the power supply and an abnormality (theft or vandalism of the vehicle 2).

The notification unit 27 is, for example, a speaker, and outputs a warning sound according to an instruction of the control unit 25. Thereby, according to the present embodiment, it is possible to prevent theft or vandalism by emitting the warning sound from the vehicle 2 according to a notification instruction from the HMD 3. Also, the notification unit 27 may be configured to emit a notification sound according to an instruction of the control unit 25. Thereby, according to the present embodiment, for example, a position of the vehicle 2 parked in a parking lot can be known according to the notification sound.

Next, the HMD 3 will be described.

The HMD 3 includes an operation unit 30, a reception unit 31, a position detection unit 32, an information generation unit 33, a display unit 34, and a transmission unit 35. The information generation unit 33 includes a storage unit 331, a control unit 332 and an image generation unit 333.

The HMD 3 receives information transmitted by the vehicle 2 and displays various types of information on the display unit 34 according to presence/absence of the notification information included in the received information. Various types of information include vehicle position information, navigation information, information of a remaining amount of fuel or battery of the vehicle 2, vehicle speed information of the vehicle 2, information indicating that an abnormality has occurred in the vehicle 2, and the like.

The operation unit 30 includes, for example, a mechanical switch, a touch panel type switch, and the like. The operation unit 30 detects a result of an operation performed by the user and outputs a detected operation instruction to the control unit 332.

The reception unit 31 includes at least one of a wired communication scheme and a wireless communication scheme. The reception unit 31 receives information from the vehicle 2 and outputs the received information to the image generation unit 333. Also, the information received from the vehicle 2 is, for example, navigation information to a destination, position information of a current location, information indicating that an abnormality has occurred in the vehicle 2, information of today's schedule, and the like.

Also, the reception unit 31 may be configured to receive an operation instruction from the vehicle 2 and output the received operation instruction to the control unit 332. The operation instruction is, for example, an instruction to set the power supply of the HMD 3 to the on state or the off state, an instruction of whether to display information on the display unit 34, an instruction for information to be displayed when the HMD 3 is in any state, or the like.

The position detection unit 32 is, for example, a GPS terminal that detects a current position of the HMD 3. The position detection unit 32 outputs information indicating the detected current position as the HMD position information to the control unit 332.

Also, HMD position information detected by the position detection unit 32 is used in navigation during travel, when the user is away from the vehicle 2 and performs navigation to the vehicle 2, or the like.

The information generation unit 33 selects information from information received by the reception unit 31 according to the operation instruction output by the operation unit 30 and generates display data based on the selected information.

The storage unit 331 stores the operation instruction output by the operation unit 30 according to control of the control unit 332. The storage unit 331 stores the information received by the reception unit 31 according to control of the control unit 332. The storage unit 331 stores a departure position (latitude and longitude) and a destination position. The storage unit 331 stores a control program to be used by the control unit 332.

The control unit 332 acquires an operation instruction output by the operation unit 30 or the reception unit 31. The control unit 332 acquires information received from the vehicle 2 output by the reception unit 31. The control unit 332 generates navigation information from the HMD 3 to the vehicle 2 using the position information of the vehicle 2 output by the reception unit 31 and the position information of the HMD 3 output by the position detection unit 32. The control unit 332 determines whether notification information is included in the information acquired from the vehicle 2. If no notification information is included, the control unit 332 outputs position information indicating a current position included in the acquired information, the speed information of the vehicle 2, navigation information from the current position to the destination, navigation information from the current position to the vehicle 2, and the like to the image generation unit 333. If the notification information is included, the control unit 332 extracts the notification information and outputs the extracted notification information to the image generation unit 333.

The image generation unit 333 acquires the information output by the reception unit 31. Also, the image generation unit 333 acquires the notification information output by the control unit 332. If the notification information is acquired, the image generation unit 333 increases priority of the notification information with respect to the information output by the reception unit 31, generates a notification image related to the notification information, and outputs the generated notification image to the display unit 34. Also, if no notification information is acquired, the image generation unit 333 generates an image related to the information output by the reception unit 31 and outputs the generated image to the display unit 34.

The display unit 34 is configured to include a projection unit which projects an image and a transparent display using, for example, a hologram. The display unit 34 transmits external light and displays an image output by the image generation unit 333 using a hologram. Also, if the HMD 3 is of an eyeglass type, the display unit 34 may be provided in both or one of the left and the right thereof.

The transmission unit 35 transmits information output by the control unit 332 to the vehicle 2. The information output by the control unit 332 includes, for example, notification information, information indicating that the remaining amount of fuel or voltage of the battery in the HMD 3 is less than or equal to the predetermined value, information indicating that the power supply of the HMD 3 is in the on state, and the like.

Next, an example of an exterior of the HMD 3 will be described.

Figure 2:
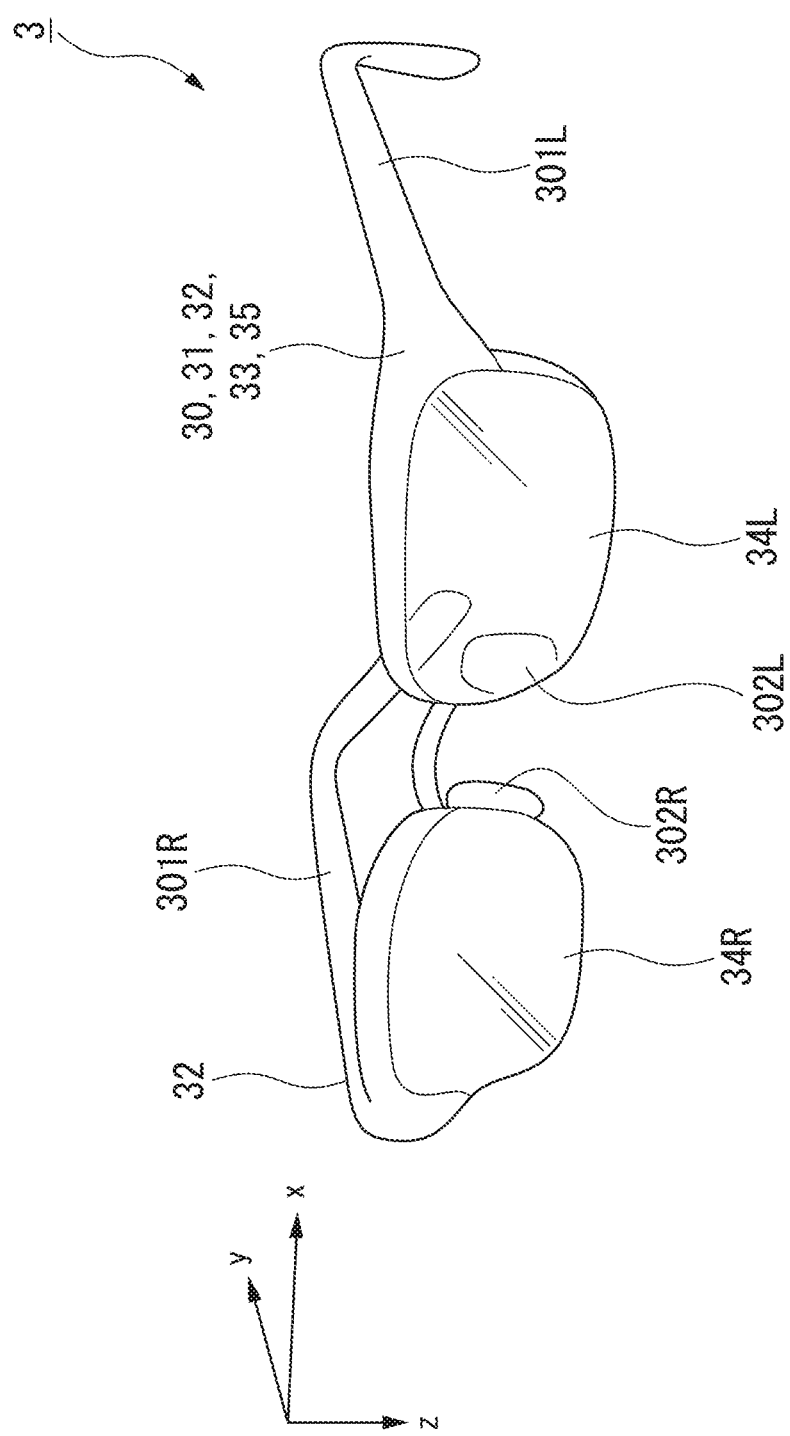
FIG. 2 is a diagram illustrating an example of an exterior of an HMD according to the first embodiment.

FIG. 2 is a diagram illustrating an example of an exterior of the HMD 3 according to the present embodiment.

Hereinafter, for coordinates when the user is upright on the ground surface and his head is equipped with the HMD 3, an up/down direction is designated as a z-axis direction, a left/right direction is designated as an x-axis direction, and a front/rear direction is designated as a y-axis direction as viewed by the user.

As illustrated in FIG. 2, the HMD 3 of the present embodiment is of an eyeglass type. The HMD 3 is configured to include display units 34R and 34L on the right and left, nosepieces 302R and 302L, a bridge 303, and temples 301R and 301L. The position detection unit 32 is attached within the right and left temples 301R and 301L and the operation unit 30, the reception unit 31, the position detection unit 32, the information generation unit 33, and the transmission unit 35 are attached within the left temple 301L. Also, a configuration illustrated in FIG. 2 is an example and a position to which each unit is attached is not limited thereto.

Figure 3:
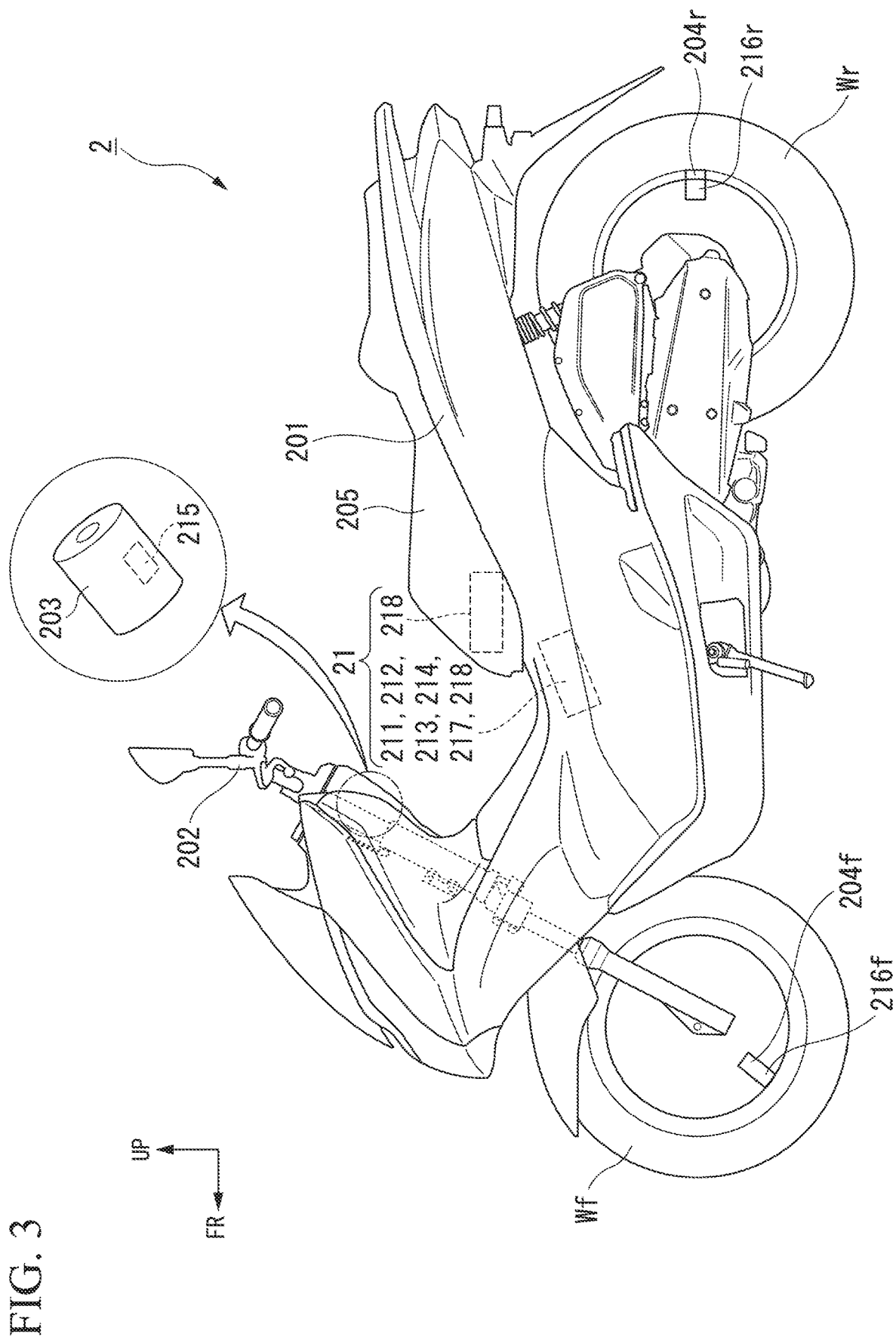
FIG. 3 is a diagram illustrating an example of an exterior of a vehicle according to the first embodiment.

FIG. 3 is a diagram illustrating an example of an exterior of the vehicle 2 according to the present embodiment. Also, in FIG. 3, an arrow FR is assumed to indicate a front direction of the vehicle 2 and an arrow UP is assumed to indicate an upward direction of the vehicle 2.

As illustrated in FIG. 3, the vehicle 2 of the present embodiment is a scooter-type and straddle-type vehicle. The vehicle 2 includes a vehicle body cover 201, a steering handlebar 202, a key cylinder 203, a front wheel Wf, a rear wheel Wr, a seat 13, etc. The key cylinder 203 includes a key detection unit 215. The front wheel Wf includes a valve 204f and the rear wheel Wr includes a valve 204r. The valve 204f includes an air pressure detection unit 216f and the valve 204r includes an air pressure detection unit 216r. Also, for example, the tilt detection unit 211, the vibration/impact detection unit 212, the rotation angle detection unit 213, the position detection unit 214, the remaining amount detection unit 217, and the vehicle speed detection unit 218 are provided inside the vehicle body cover 201. Also, the seat 13 includes a cover opening/closing detection unit 219. Also, the configuration illustrated in FIG. 3 is an example and a position to which each unit is attached is not limited thereto.

<Example of Information Displayed on Display Unit 34 of HMD 3>

Here, an example of information to be displayed on the display unit 34 of the HMD 3 will be described.

First, an example of information in which the HMD 3 displays the power supply of the vehicle 2 in the on state during travel of the vehicle 2 will be described.

Figure 4:
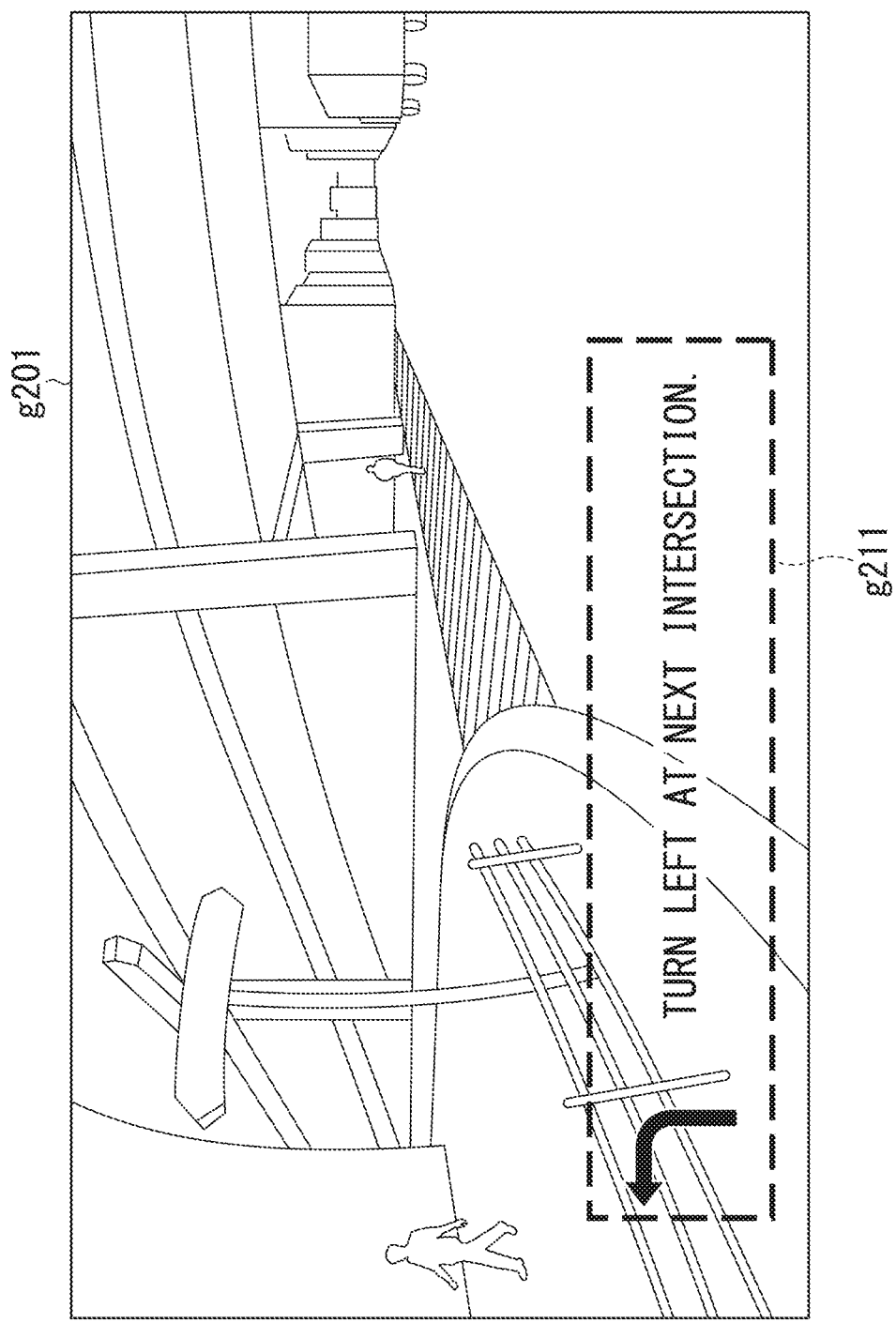
FIG. 4 is a diagram illustrating an example of information displayed on a display unit during travel according to the first embodiment.

FIG. 4 is a diagram illustrating an example of information displayed on the display unit 34 during travel according to the present embodiment.

An image g201 is an example of an image displayed on the display unit 34 when a head of the user is equipped with the HMD 3 and the power supply of the vehicle 2 is in the on state. The displayed image is information of a region surrounded by a chain line g211 in an external world image. The information of the region surrounded by the chain line g211 is navigation information. For example, an image indicating a course, an image indicating a route, an image indicating the name of a current intersection, an image indicating the name of the next intersection, an image indicating a distance to the next intersection, etc. are included. Also, the user may set a display position of the navigation information by operating the HMD 3 or the display position of the navigation information may be a predetermined position. It is preferable that the predetermined position be, for example, a position at which a road surface is assumed to be viewed in a field of view of the user.

Next, an example of information displayed by the HMD 3 when the power supply of the vehicle 2 is in the off state after the vehicle 2 is stopped will be described.

Figure 5:
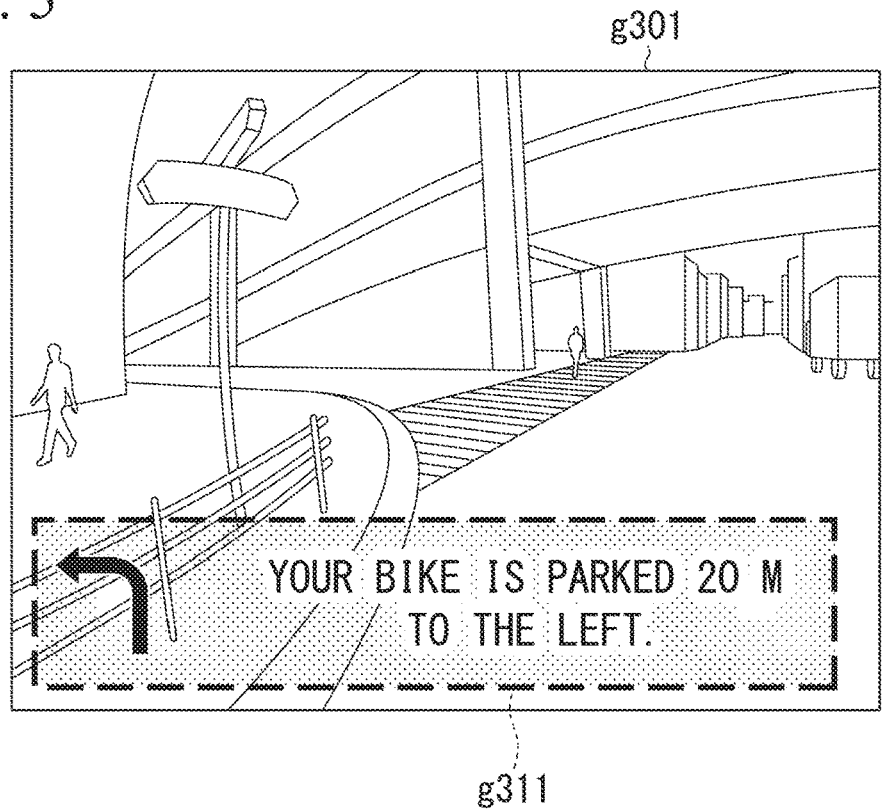
FIG. 5 is a diagram illustrating an example of information displayed on the display unit under normal circumstances in a state in which the power supply is turned off after the vehicle is stopped according to the first embodiment.

FIG. 5 is a diagram illustrating an example of information displayed on the display unit 34 under normal circumstances in a state in which the power supply is turned off after stopping of the vehicle 2 according to the present embodiment. Also, this is a state in which the user walks toward the vehicle 2 after setting the power supply of the vehicle 2 to the off state and getting out of the vehicle 2.

An image g301 is an example of an image displayed on the display unit 34 when the head of the user is equipped with the HMD 3, the power supply of the vehicle 2 is in the off state, and no abnormality has occurred in the vehicle 2. The displayed image includes information of a region surrounded by the chain line g311 in an external world image. The information of the region surrounded by the chain line g311 is navigation information from a current position to the vehicle 2. In the region surrounded by the chain line g311, for example, an arrow indicating a direction in which a bike is parked and a message of "Your bike is parked 20 m to the left" are displayed. The user can know a position of his/her parked vehicle 2 by viewing the display.

Figure 6:
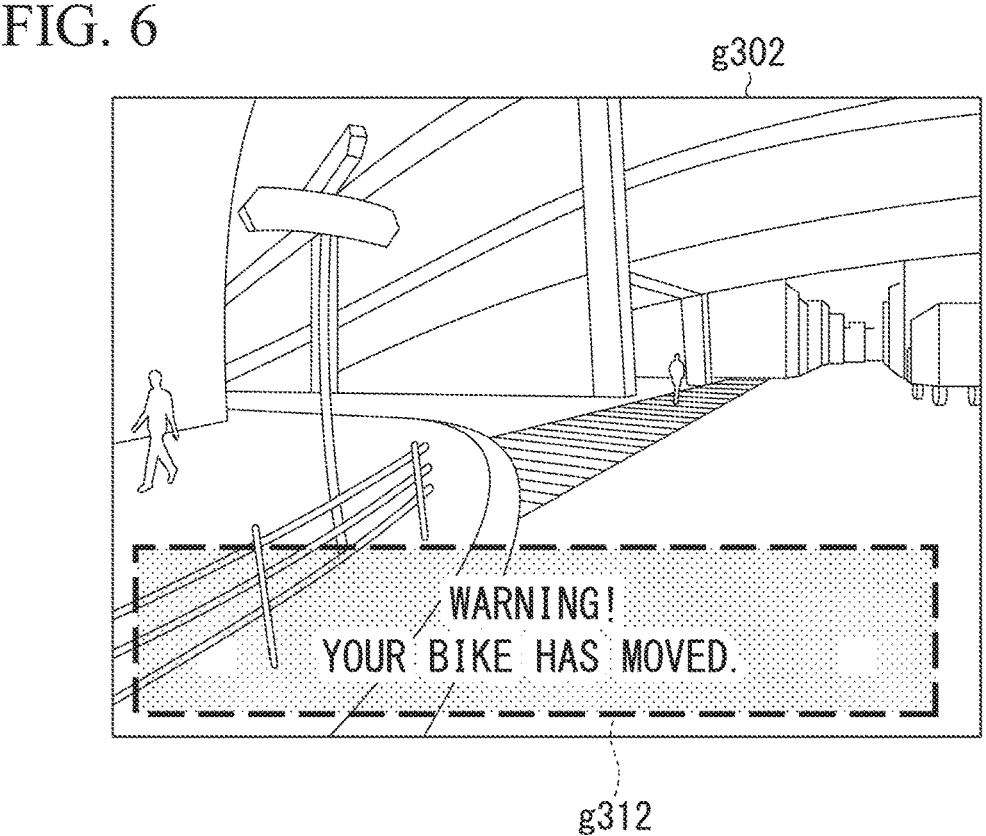
FIG. 6 is a diagram illustrating an example of information displayed on the display unit under abnormal circumstances in a state in which the power supply is turned off after the vehicle is stopped according to the first embodiment.

FIG. 6 is a diagram illustrating an example of information displayed on the display unit 34 under abnormal circumstances in a state in which the power supply is turned off after the vehicle 2 is stopped according to the present embodiment. Also, this is a state in which the user walks toward the vehicle 2 after setting the power supply of the vehicle 2 to the off state and getting out of the vehicle 2.

An image g302 is an example of an image displayed on the display unit 34 when the head of the user is equipped with the HMD 3, the power supply of the vehicle 2 is in the off state, and no abnormality has occurred in the vehicle 2. The displayed image is information of a region surrounded by a chain line g312 in an external world image. The information of the region surrounded by the chain line g312 indicates that an abnormality has occurred in the vehicle 2

(the bike). In the region surrounded by the chain line g312, for example, a message of "Warning! Your bike has moved" is displayed. The user can know that his/her vehicle 2 has moved, that is, that his/her vehicle 2 is at risk of being stolen, by viewing the display. According to this, the user operates the operation unit 30 of the HMD 3. Thereby, the HMD 3 transmits a notification instruction to the vehicle 2. The vehicle 2 receives the notification instruction transmitted by the HMD 3 and provides a notification of a warning sound according to the received notification instruction. Thereby, according to the present embodiment, it is possible to prevent theft.

Also, an example in which the vehicle 2 has moved is shown in the example illustrated in FIG. 6, but the HMD 3 displays a warning according to a state on the display unit 34 when the vehicle 2 is tilted at an angle greater than a predetermined angle, when the vehicle 2 drops, when an impact of a predetermined value or more is applied to the vehicle 2, and the like.

Next, an example of a processing procedure to be performed by the vehicle 2 and the HMD 3 of the present embodiment will be described.

Figure 7:
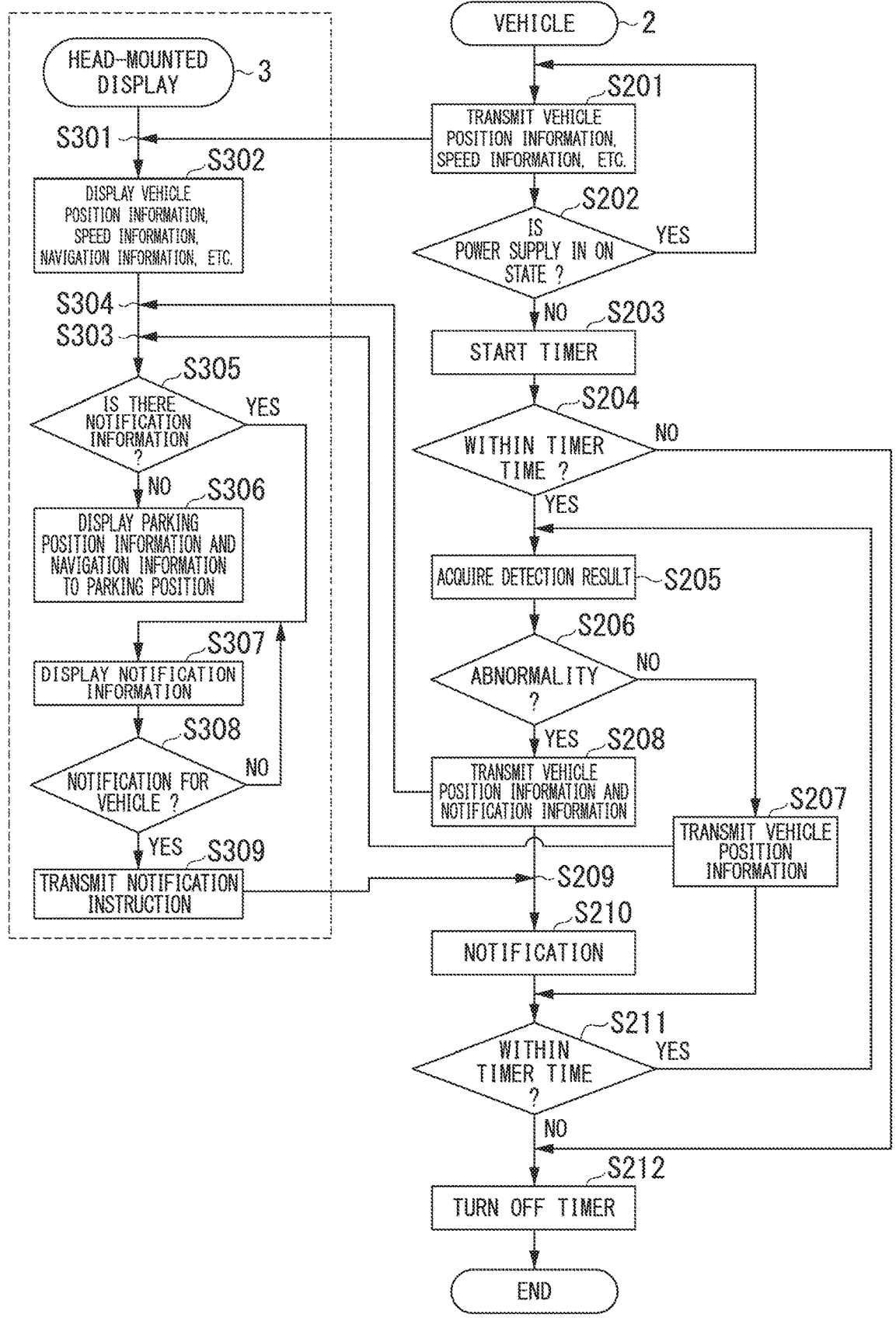
FIG. 7 is a flowchart of a process to be performed by the vehicle and the HMD according to the first embodiment.

FIG. 7 is a flowchart of a process to be performed by the vehicle 2 and the HMD 3 according to the present embodiment.

First, a process to be performed by the vehicle 2 will be described.

(Step S201) The detection unit 21 detects a state of the vehicle 2 and outputs information indicating the detected state to the control unit 25. Subsequently, when the vehicle 2 is in the on state, the control unit 25 acquires vehicle position information, speed information, and the like output by the detection unit 21 and transmits the acquired vehicle position information and speed information and the like to the HMD 3.

(Step S202) The control unit 25 acquires key information indicating whether the power supply is in the on state and whether the key is inserted output by the key detection unit 215. Subsequently, the control unit 25 determines whether the power supply is in the on state on the basis of the acquired information. If it is determined that the power supply is in the on state (step S202; YES), the control unit 25 returns the process to step S201. If it is determined that the power supply is in the off state (step 202; NO), the control unit 25 switches information to be transmitted to the HMD 3 from the vehicle position information and the speed information to the vehicle position information and the notification information or switches the information to the vehicle position information and moves the process to step S203.

(Step S203) The control unit 25 outputs an instruction to start a timer operation to the timer unit 23. Subsequently, the timer unit 23 starts the timer operation when the control unit 25 has output the timer operation start instruction.

(Step S204) The control unit 25 determines whether the time is within the timer time. The control unit 25 moves the process to step S205 if it is determined that the time is within the timer time (step S204; YES) and moves the process to step S212 if it is determined that the time is not within the timer time (step S204; NO).

(Step S205) The control unit 25 acquires each detection result output by the detection unit 21.

(Step S206) The control unit 25 determines whether an abnormality has occurred in the vehicle 2 on the basis of information indicating tilt, information indicating vibration or an impact, information indicating a rotation angle, vehicle position information, key information indicating whether a key is inserted, information indicating an air pressure, information indicating a remaining amount of fuel or battery, and information indicating opening/closing. The control unit 25 moves the process to step S207 if an abnormality has occurred in the vehicle 2 (step S206; YES) and moves the process to step S208 if no abnormality has occurred in the vehicle 2 (step S206; NO).

(Step S207) The control unit 25 transmits vehicle position information to the HMD 3.

(Step S208) The control unit 25 transmits the vehicle position information and notification information to the HMD 3. The control unit 25 moves the process to step S209.

(Step S209) The control unit 25 receives a notification instruction from the HMD 3.

(Step S210) The control unit 25 provides a notification of a warning sound or the like according to the received notification instruction.

(Step S211) The control unit 25 determines whether the time is within the timer time. The control unit 25 returns the process to step S205 if it is determined that the time is within the timer time (step S211; YES) and moves the process to step S212 if it is determined that the time is not within the timer time (step S211; NO).

(Step S212) The control unit 25 outputs an instruction to set the timer operation to the off state to the timer unit 23.

The control unit 25 ends the process after the timer operation ends.

Next, the process of the HMD 3 will be described.

(Step S301) The control unit 332 of the HMD 3 acquires the vehicle position information, the speed information, etc. transmitted by the vehicle 2.

(Step S302) The control unit 332 generates navigation information to a destination using the received vehicle position information and speed information, information indicating the destination stored by the storage unit 331, and the like. Subsequently, the control unit 332 displays the received vehicle position information and speed information, the generated navigation information, and the like on the display unit 34.

(Step S303) The control unit 332 receives the vehicle position information transmitted by the vehicle 2. The control unit 332 moves the process to step S305.

(Step S304) The control unit 332 receives the vehicle position information and the notification information transmitted by the vehicle 2. The control unit 332 moves the process to step S305.

(Step S305) The control unit 332 determines whether the notification information is included in the information received in step S303 or step S304. The control unit 332 moves the process to step S307 if it is determined that notification information is included (step S305; YES) and moves the process to step S306 if it is determined that no notification information is included (step S305; NO).

(Step S306) The position detection unit 32 detects the current position of the HMD 3. Subsequently, the control unit 332 generates the navigation information from a current position to a position at which the vehicle 2 is parked using the received vehicle position information and the HMD position information detected by the position detection unit 32. Subsequently, the control unit 332 displays the generated navigation information on the display unit 34. According to a result in which the user has operated the operation unit 30, for example, the control unit 332 iterates the processes of steps S303 to S309 until an instruction to end the display of the navigation information is detected.

(Step S307) The control unit 332 performs display based on the notification information on the display unit 34. The control unit 332 moves the process to step S308.

(Step S308) The control unit 332 determines whether a device instruction for the vehicle 2 is detected according to the result in which the user has operated the operation unit 30. The control unit 332 moves the process to step S309 if it is determined that a device instruction for the vehicle 2 is detected (step S308; YES) and returns the process to step S307 if it is determined that no device instruction for the vehicle 2 is detected (step S308; NO).

(Step S309) The control unit 332 generates a notification instruction and transmits the generated notification instruction to the vehicle 2. Also, the control unit 332 iterates the processes of steps S303 to S309 until an instruction to end the notification is detected according to the result in which the user has operated the operation unit 30.

According to the present embodiment as described above, power is supplied to each unit of the vehicle 2 for a predetermined time set by the timer unit 23 even after the power supply of the vehicle 2 is in the off state. Thereby, the control unit 25 of the vehicle 2 can determine whether an abnormality has occurred in the vehicle 2 on the basis of the result output by the detection unit 21. If no abnormality has occurred in the vehicle 2, the control unit 25 transmits vehicle position information output by the position detection unit 214 to the HMD 3. On the other hand, if an abnormality has occurred in the vehicle 2, the control unit 25 transmits the vehicle position information output by the position detection unit 214 and notification information indicating that the abnormality has occurred in the vehicle 2 to the HMD 3.

If no abnormality has occurred in the vehicle 2, that is, if no notification information is included in the information transmitted by the vehicle 2, the HMD 3 can generate navigation information to the vehicle 2 using the vehicle position information and HMD position information and display the generated navigation information on the display unit 34. Also, if an abnormality has occurred in the vehicle 2, that is, if the notification information is included in the information transmitted by the vehicle 2, the HMD 3 can perform display according to the notification information on the display unit 34.

Thereby, according to the present embodiment, it is possible to display information of the vehicle 2 (navigation information to the parking position and information indicating that the abnormality has occurred in the vehicle 2) even after the power supply of the vehicle 2 is in the off state. As a result, according to the present embodiment, the convenient vehicle 2 can be provided to the user because the information of the vehicle 2 can be provided to the user even in a state in which the power supply is turned off.

Also, according to the present embodiment, after the power supply of the vehicle 2 is in the off state, the user can know that an abnormality has occurred in the vehicle 2 through display of the HMD 3. Specifically, it is possible to know whether the vehicle 2 drops after parking, whether the vehicle 2 is stolen, whether he/she forgot to remove a key, whether he/she forgot to lock the handlebars, whether he/she forgot to close a cover of the storage part, whether he/she forgot to lock the side stand, whether a voltage of the battery is reduced, whether an air pressure of a tire is insufficient, whether a tire is flat, etc.

Also, an example in which the HMD 3 is used as the image display device has been described in the present embodiment, but the image display device may be, for example, a portable phone such as a smartphone, a tablet terminal, a portable game device, or the like including a display unit and a reception unit. In this case, the image display device such as a portable phone such as a smartphone, a tablet terminal, or a portable game device may display navigation information on the display unit if no abnormality has occurred in the vehicle 2 and perform display according to notification information on the display unit when an abnormality has occurred in the vehicle 2.

Second Embodiment

Figure 8:
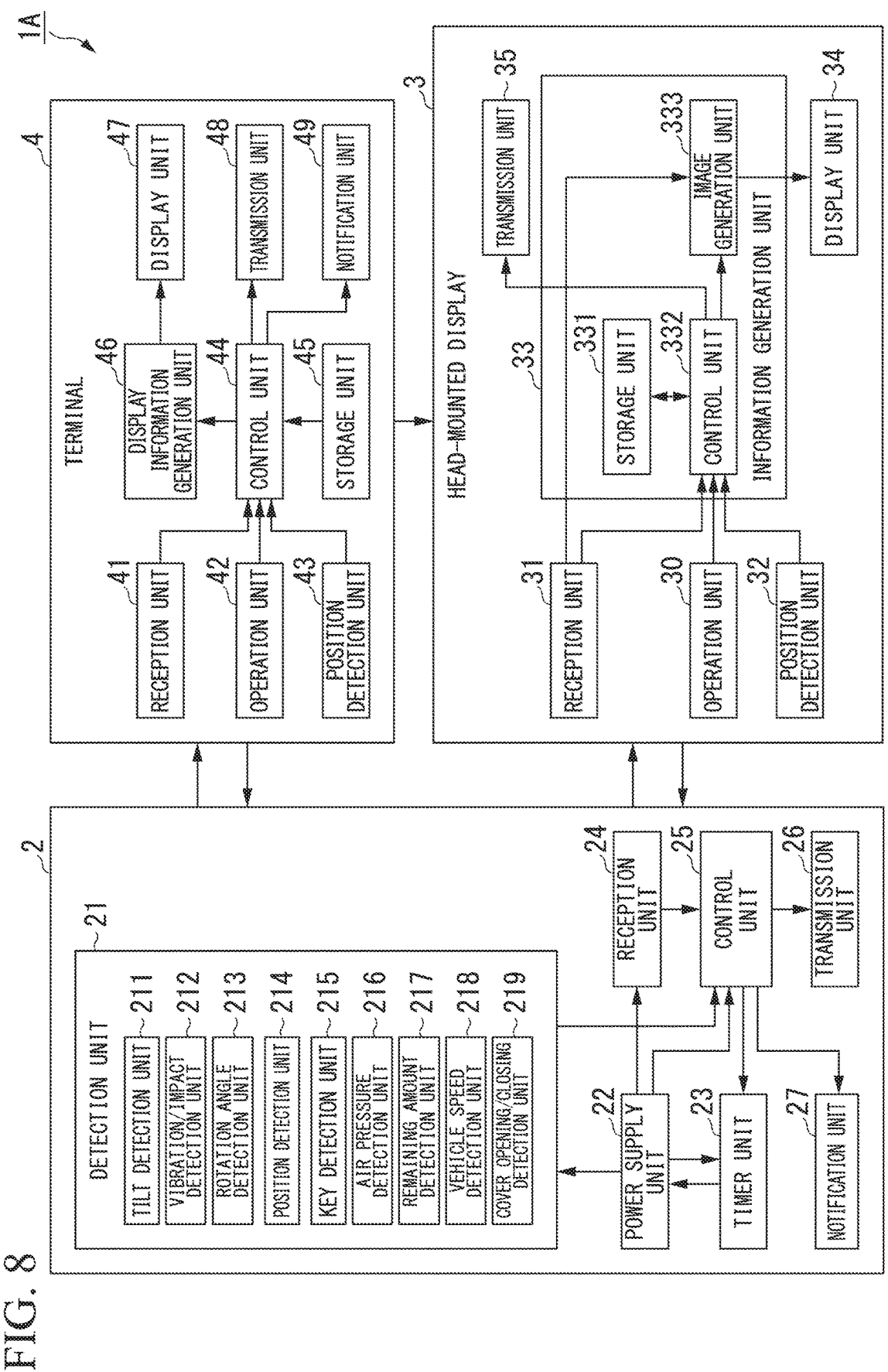
FIG. 8 is a block diagram illustrating a schematic configuration of a vehicle detection system according to a second embodiment.

FIG. 8 is a block diagram illustrating a schematic configuration of a vehicle detection system 1A according to the present embodiment.

As illustrated in FIG. 8, the vehicle detection system 1A includes a vehicle 2, an HMD 3 (an image display device), and a terminal 4 (an image display device). Also, the same reference signs are used in functional units having the same functions as those of the vehicle detection system 1 in the first embodiment and description thereof will be omitted.

The vehicle 2 and the terminal 4 or the HMD 3 and the terminal 4 perform communication using, for example, a short-range wireless communication standard. The short-range wireless communication standard is, for example, communication of a BLE standard. Also, if the vehicle 2, the HMD 3, and the terminal 4 perform communication, the vehicle 2 is paired with the HMD 3 and the terminal 4. If the HMD 3 and the terminal 4 perform communication, the HMD 3 is paired with the terminal 4.

As illustrated in FIG. 8, configurations of the vehicle 2 and the HMD 3 are the same as those of the vehicle detection system 1 in the first embodiment.

The terminal 4 will be described.

The terminal 4 includes a reception unit 41, an operation unit 42, a position detection unit 43, a control unit 44, a storage unit 45, a display information generation unit 46, a display unit 47, a transmission unit 48, and a notification unit 49.

The terminal 4 is, for example, a smartphone 4 (an image display device), a tablet terminal 4 (an image display device), a portable game device 4 (an image display device), or the like. Also, when none of the smartphone 4 (the image display device), the tablet terminal 4 (the image display device), and the portable game device 4 (the image display device) is specified in the following description, it is referred to as the terminal 4. If the terminal 4 detects an operation instruction of the user and an instruction for the HMD 3 is included in the detected operation instruction, the instruction is extracted and the extracted instruction is transmitted to the HMD 3. The terminal 4 receives information received by the vehicle 2 and displays various types of information on the display unit 47 according to presence/absence of the notification information included in the received information. Also, the terminal 4 generates the notification instruction according to an operation result detected by the operation unit 42 and transmits the generated notification instruction to the vehicle 2.

The reception unit 41 receives information indicating the state of the vehicle 2 transmitted by the vehicle 2 and outputs the received information indicating the state of the vehicle 2 to the display information generation unit 46. The reception unit 41 outputs the information output by the HMD 3 to the control unit 44. The reception unit 41 may be configured to receive navigation information to the destination via a network (not illustrated) and output the received navigation information to the control unit 44. Also, the reception unit 41 may be configured to receive a weather forecast, information indicating a current location, information of a shop or the like near the current location, congestion information on a road of a vehicle, and the like via the network and output the received information to the control unit 44.

The operation unit 42 is, for example, a touch panel type sensor attached to the display unit 47, detects an operation of the user, and outputs a detected operation result to the control unit 44. Also, the operation result includes an information display instruction to set information to be displayed on the display unit 47, an information non-display instruction to set no information to be displayed on the display unit 47, information indicating a point of departure, information indicating a destination, an instruction to acquire navigation information, an instruction to generate a notification instruction, etc.

The position detection unit 43 is, for example, a GPS terminal that detects a current position of the terminal 4. The position detection unit 43 outputs information indicating the detected current position as terminal position information to the control unit 44. Also, the terminal position information detected by the position detection unit 43 is used in navigation during travel, when the user is away from the vehicle 2 and performs navigation to the vehicle 2, or the like.

The control unit 44 acquires an operation instruction output by the reception unit 41 or the operation unit 42. The control unit 44 acquires information received from the vehicle 2 output by the reception unit 41. The control unit 44 determines whether notification information is included in the information acquired from the vehicle 2. If no notification information is included, the control unit 44 outputs position information indicating a current position included in the acquired information, the speed information of the vehicle 2, navigation information from the current position to the destination, navigation information from the current position to the vehicle 2, and the like to a display information generation unit 46. If notification information is included, the control unit 44 extracts the notification information and outputs the extracted notification information to the display information generation unit 46 and the notification unit 49. If the operation unit 42 outputs an instruction to generate the notification instruction, the control unit 44 generates the notification instruction and controls the transmission unit 48 to transmit the generated notification instruction to the vehicle 2.

The storage unit 45 stores the operation instruction output by the operation unit 42 according to control of the control unit 44.

The storage unit 45 stores information received by the reception unit 41 according to control of the control unit 44. The storage unit 45 stores a departure position and a destination position. The storage unit 45 stores a control program to be used by the control unit 44.

The display information generation unit 46 generates an image according to the position information indicating the current position, the speed information of the vehicle 2, the navigation information from the current position to the destination, the navigation information from the current position to the vehicle 2, the notification information, or the like output by the control unit 44 and outputs the generated image to the display unit 47.

The display unit 47 is, for example, a liquid crystal display panel and is configured to include a backlight. The display unit 47 displays an image output by the control unit 44.

The transmission unit 48 transmits the notification instruction output by the control unit 44 to the vehicle 2.

The notification unit 49 is, for example, a vibrator, a speaker, an LED, or the like. The notification unit 49 provides a notification according to the notification information output by the control unit 44.

Figure 9:
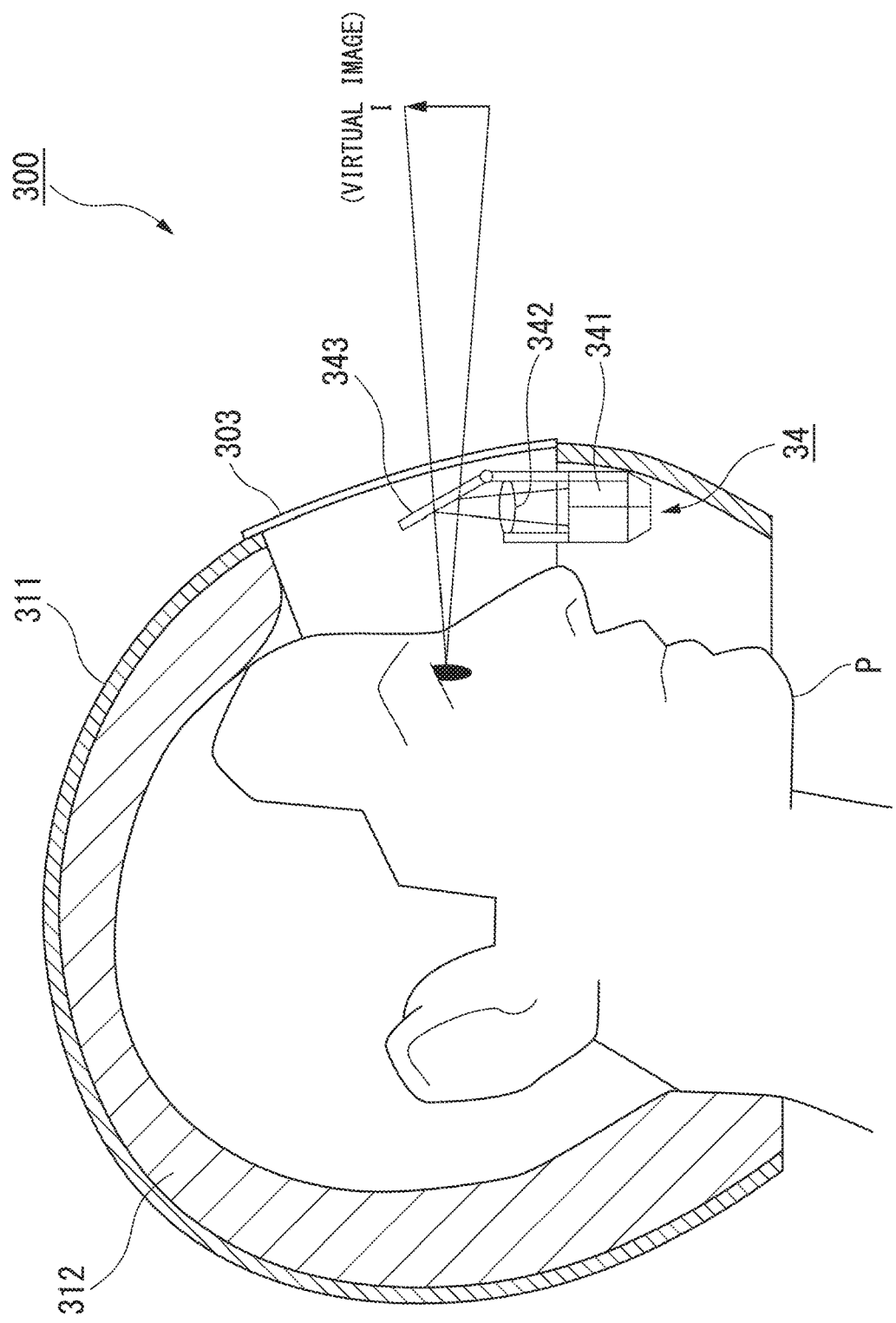
FIG. 9 is a diagram illustrating an example of an exterior of an HMD according to the second embodiment.

FIG. 9 is a diagram illustrating an example of an exterior of the HMD 3 according to the present embodiment.

As illustrated in FIG. 9, the HMD 3 is attached to a helmet 300. As illustrated in FIG. 9, the helmet 300 includes a cap body (a shell) 311, an impact absorption liner 312, and a shield 313. Also, the display unit 34 of the HMD 3 includes a projection unit 341, a lens 342, and a combiner 343.

The projection unit 341 outputs visual information to the combiner 343 via the lens 342. The lens 342 concentrates light for the visual information output by the projection unit 341 on the combiner 343. The combiner 343 is a half-mirror for causing a landscape in front of the user P and a video to be shown in a superimposed state. The user P can view an external world video and the visual information projected by the projection unit 341 as a virtual image I via the combiner 343. Also, the configuration illustrated in FIG. 9 is an example and is not limited thereto. The configuration described with reference to FIG. 2 of the first embodiment may be provided.

Also, the HMD 3 is attached to the helmet 300 in the example illustrated in FIG. 9, but is not limited thereto. The HMD 3 may be of an eyeglass type as in the first embodiment, a goggle type, or the like.

Next, an example of a processing procedure to be performed by the vehicle 2, the HMD 3, and the terminal 4 of the present embodiment will be described.

Figure 10:
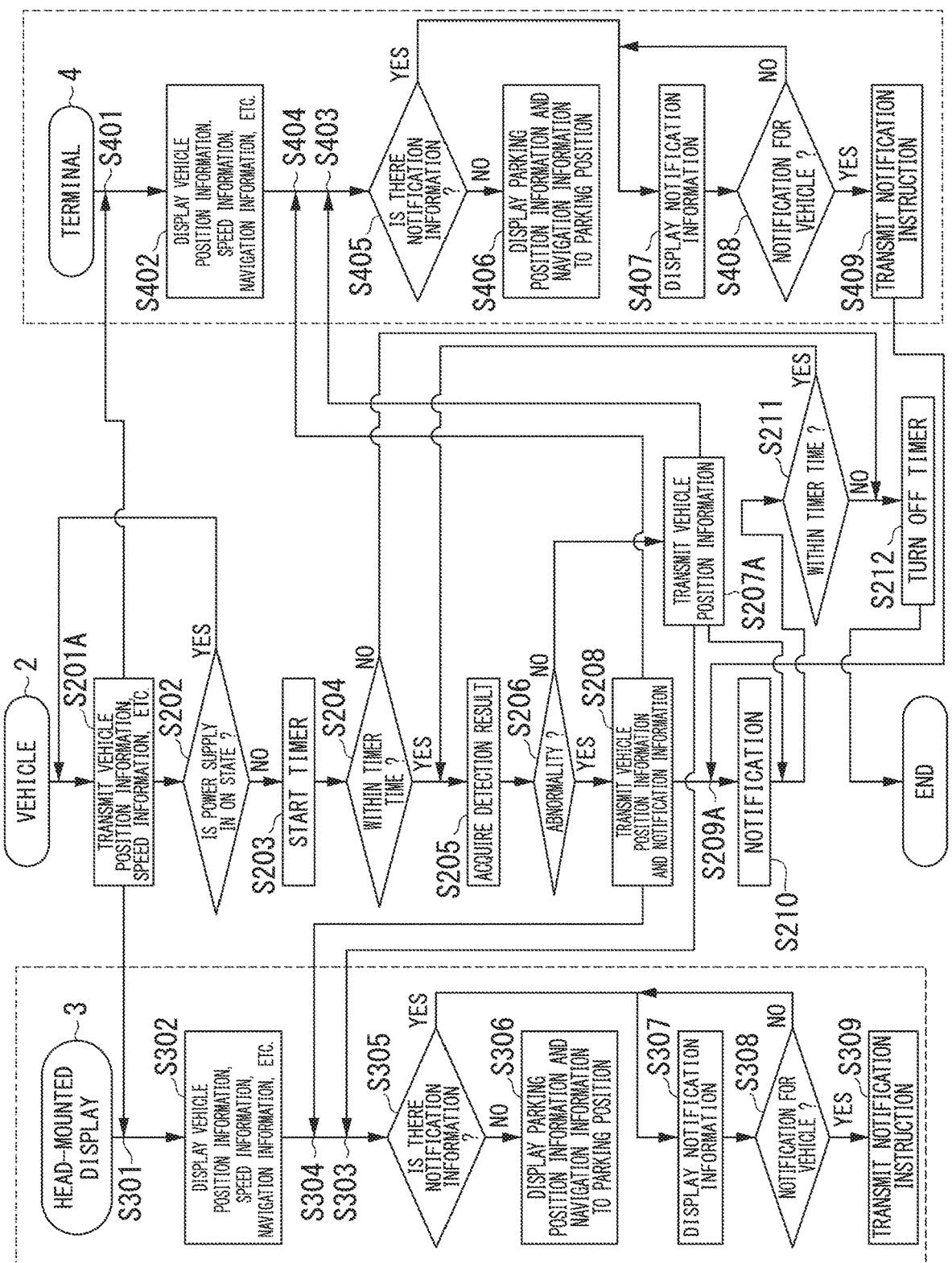
FIG. 10 is a flowchart of a process to be performed by a vehicle, the HMD, and a terminal according to the second embodiment.

FIG. 10 is a flowchart of a process to be performed by the vehicle 2, the HMD 3, and the terminal 4 according to the present embodiment. Also, the same reference signs are used in the same processes as those of FIG. 7 and description thereof will be omitted. Also, in the following example, the HMD 3 and the terminal 4 are connected to the vehicle 2 via the wireless communication. Also, a process to be performed by the HMD 3 is similar to that of FIG. 7.

First, the process to be performed by the vehicle 2 will be described.

(Step S201A) When the power supply of the vehicle 2 is in the on state, the control unit 25 acquires vehicle position information, speed information, and the like output by the detection unit 21 and transmits the acquired vehicle position information and speed information and the like to the HMD 3 and the terminal 4.

Then, the control unit 25 performs processes of steps S202 to S205.

(Step S206) The control unit 25 determines whether an abnormality has occurred in the vehicle 2. The control unit 25 moves the process to step S207A if it is determined that an abnormality has occurred in the vehicle 2 (step S206; YES) and moves the process to step S208 if it is determined that no abnormality has occurred in the vehicle 2 (step S206; NO).

(Step S207A) The control unit 25 transmits the vehicle position information to the HMD 3 and the terminal 4.

(Step S208A) The control unit 25 transmits the vehicle position information and the notification information to the HMD 3 and the terminal 4. The control unit 25 moves the process to step S209.

(Step S209) The control unit 25 receives a notification instruction from the HMD 3.

(Step S209A) The control unit 25 receives the notification instruction from the terminal 4. Also, the control unit 25 may be configured to receive the notification instruction from at least one of the HMD 3 and the terminal 4.

(Step S210) The control unit 25 provides a notification such as a warning sound according to the received notification instruction.

(Steps S211 and S212) The control unit 25 performs processes of steps S211 and S212 as in FIG. 7.

The control unit 25 ends the process after the timer operation ends.

Next, a process to be performed by the terminal 4 will be described.

(Step S401) The control unit 44 of the terminal 4 acquires vehicle position information, speed information, and the like transmitted by the vehicle 2.

(Step S402) The control unit 44 generates navigation information to the destination using the received vehicle position information and speed information, the information indicating the destination stored by the storage unit 45, and the like. Subsequently, the control unit 44 displays the received vehicle position information and speed information, the generated navigation information, and the like on the display unit 47.

(Step S403) The control unit 44 receives vehicle position information transmitted by the vehicle 2. The control unit 44 moves the process to step S405.

(Step S404) The control unit 44 receives the vehicle position information and the notification information transmitted by the vehicle 2. The control unit 44 moves the process to step S405.

(Step S405) The control unit 44 determines whether the notification information is included in the information received in step S403 or S404. The control unit 44 moves the process to step S407 if it is determined that notification information is included (step S405; YES) and moves the process to step S406 if it is determined that no notification information is included (step S405; NO).

(Step S406) The position detection unit 43 detects a current position of the terminal 4. Subsequently, the control unit 44 generates navigation information from a current position to a position at which the vehicle 2 is parked using the received vehicle position information and the terminal position information detected by the position detection unit 43. Subsequently, the control unit 44 displays the generated navigation information on the display unit 47. The control unit 44 iterates processes of steps S403 to S409, for example, until an instruction to end the display of the navigation information is detected, according to a result in which the user operates the operation unit 42.

(Step S407) The control unit 44 performs display based on the notification information on the display unit 47. The control unit 44 moves the process to step S408.

(Step S408) The control unit 44 determines whether a device instruction for the vehicle 2 is detected according to a result in which the user operates the operation unit 42. The control unit 44 moves the process to step S409 if it is determined that a device instruction for the vehicle 2 is detected (step S408; YES) and returns the process to step S407 if it is determined that no device instruction for the vehicle 2 is detected (step S408; NO).

(Step S409) The control unit 44 generates a notification instruction and transmits the generated notification instruction to the vehicle 2. Also, the control unit 44 iterates processes of steps S403 to S409, for example, until an instruction to end the notification is detected, according to a result in which the user operates the operation unit 42.

Also, an example in which vehicle position information, speed information, and the like are transmitted to the HMD 3 and the terminal 4 when the power supply of the vehicle 2 is in the on state has been described in the example illustrated in FIG. 10, but the information may be transmitted to only the HMD 3.

Also, an example in which the vehicle 2 transmits the vehicle position information and the notification information to the HMD 3 and the terminal 4 in step S208A has been described in the example illustrated in FIG. 10, but the information may be transmitted to only the HMD 3. In this case, if the notification information is included (step S305; YES), the control unit 332 of the HMD 3 may be configured to transmit the vehicle position information and the notification information to the terminal 4 while displaying the notification information on the display unit 34. According to the reception of the notification information from the HMD 3, the control unit 44 of the terminal 4 may be configured to display the notification information on the display unit 34. In this case, when an abnormality has occurred in the vehicle 2, the control unit 332 of the HMD 3 may be configured to cause a warning of "Warning! Your bike has moved. Please confirm its position on your smartphone," to be displayed on the display unit 34. Alternatively, if the notification instruction is received, the control unit 44 of the terminal 4 may provide a notification by vibrating a vibrator which is the notification unit 49 or provide a notification by emitting a warning sound from a speaker which is the notification unit 49. Thus, the user can recognize that the abnormality has occurred in the vehicle 2 by the notification from the terminal 4, for example, even when the HMD 3 is not mounted, by transmitting a notification instruction from the HMD 3 to the terminal 4.

According to the present embodiment as described above, power is supplied to each unit of the vehicle 2 for a predetermined time set by the timer unit 23 even after the power supply of the vehicle 2 is in the off state. Thereby, the control unit 25 of the vehicle 2 can determine whether the abnormality has occurred in the vehicle 2 on the basis of a result output by the detection unit 21. If no abnormality has occurred in the vehicle 2, the control unit 25 transmits the vehicle position information output by the position detection unit 214 to the HMD 3 and the terminal 4. On the other hand, if an abnormality has occurred in the vehicle 2, the control unit 25 transmits the vehicle position information output by the position detection unit 214 and notification information indicating that the abnormality has occurred in the vehicle 2 to the HMD 3 and the terminal 4. If no abnormality has occurred in the vehicle 2, that is, if no notification information is included in the information transmitted by the vehicle 2, the HMD 3 can generate navigation information to the vehicle 2 using the vehicle position information and the HMD position information and display the generated navigation information on the display unit 34. Also, if an abnormality has occurred in the vehicle 2, that is, if the notification information is included in the information transmitted by the vehicle 2, the HMD 3 can display according to the notification information on the display unit 34. Further, according to the present embodiment, the user can recognize the position of the vehicle 2 using the terminal 4 and the control unit 44 of the terminal 4 transmits a notification instruction which is an instruction to emit a warning sound or the like to the vehicle 2.

Thereby, according to the present embodiment, it is possible to display information of the vehicle 2 (navigation information to a parking position and information that an abnormality has occurred in the vehicle 2) even after the power supply of the vehicle 2 is in the off state. As a result, according to the present embodiment, it is possible to provide the convenient vehicle 2 to the user because information of the vehicle 2 can be provided to the user even when the power supply is in the off state. Also, when a plurality of abnormalities have simultaneously occurred, the HMD 3 may display a plurality of icons on the display unit 34 or periodically switch and display a plurality of icons on the display unit 34. Also, the icon indicates an abnormality.

Also, an example in which communication of a BLE standard is used in communication of the vehicle 2 and the HMD 3 in the first embodiment and the communication of the BLE standard is used in communication of the vehicle 2, the HMD 3, and the terminal 4 in the second embodiment has been described, but the present invention is not limited thereto. For example, the control unit 25 may be configured to perform the communication of the BLE standard when the power supply of the vehicle 2 is in the on state and perform switching to communication of another standard when the power supply of the vehicle 2 is in the off state. Thereby, it is possible to reduce power consumption of the vehicle detection system 1 when the vehicle 2 is traveling and transmit information to a farther position by performing switching to a communication standard in which the information can be transmitted to the farther position even when a distance from the HMD 3 or the terminal 4 is far when the power supply of the vehicle 2 is in the off state.

Also, an example in which the control unit 25 of the vehicle 2 determines whether an abnormality has occurred in the vehicle 2 on the basis of a result detected by the detection unit 21 in the first and second embodiments has been described, but the present invention is not limited thereto. The control unit 25 may be configured to transmit the detected result of the detection unit 21 to the HMD 3 or the terminal 4. At least one of the HMD 3 and the terminal 4 receiving the detection result from the vehicle 2 may be configured to determine whether an abnormality has occurred in the vehicle 2 on the basis of the detection result.

Also, an example in which information is transmitted to the HMD 3 or the terminal 4 only during a timer operation of the timer unit 23 of the vehicle 2 after the power supply of the vehicle 2 is in the off state has been described in the first and second embodiments, but the present invention is not limited thereto. For example, after the power supply of the vehicle 2 is in the off state, power may be supplied to each unit in predetermined cycles or power may be continuously supplied to each unit. This selection may be performed by the user operating, for example, the operation unit 30 of the HMD 3, and the control unit 332 may transmit an operation result to the vehicle 2. The control unit 25 may be configured to switch a supply timing of the power supply according to the received operation result. Also, the power supply for supplying power to each unit to be used in the notification process may be provided separately from the battery of the vehicle 2.

Also, transmission/reception of information, detection of an abnormality of the vehicle 2, a notification, etc. may be performed by recording a program for implementing functions of the vehicle 2, the HMD 3, and the terminal 4 in the present invention on a computer-readable recording medium and causing a computer system to read and execute the program recorded on the recording medium. Also, "computer system" used here is assumed to include an operating system (OS) and hardware such as peripheral devices. Also, the computer system is assumed to include a World Wide Web (WWW) system having a homepage-providing environment (or displaying environment). In addition, the "computer-readable recording medium" refers to a storage apparatus including a flexible disk, a magneto-optical disc, a read-only memory (ROM), or a portable medium such as a compact disc (CD)-ROM, and a hard disk embedded in the computer system. Furthermore, the "computer-readable recording medium" is assumed to include a medium that holds a program for a constant period of time, such as a volatile memory (random access memory (RAM)) inside a computer system serving as a server or a client when the program is transmitted via a network such as the Internet or a communication circuit such as a telephone circuit.

Also, the above-described program may be transmitted from a computer system storing the program in a storage apparatus or the like via a transmission medium or transmitted to another computer system by transmission waves in a transmission medium. Here, the "transmission medium" for transmitting the program refers to a medium having a function of transmitting information, such as a network (communication network) like the Internet or a communication circuit (communication line) like a telephone circuit. Also, the above-described program may be a program for implementing some of the above-described functions. Further, the above-described program may be a program capable of implementing the above-described function in combination with a program already recorded on the computer system, i.e., a so-called differential file (differential program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle, comprising:
   a detection unit configured to detect a state of the vehicle and including a position detection unit configured to detect position information of the vehicle;
   a transmission unit configured to transmit information based on a result of the detection performed by the detection unit to an image display device; and
   a control unit configured to change information to be transmitted to the image display device when a power supply of the vehicle has changed from an on state to an off state, and to determine whether an abnormality has occurred in the vehicle using the detection result when it is determined that the power supply of the vehicle is in the off state,
   wherein the transmission unit transmits the position information detected by the position detection unit and information indicating that the abnormality has occurred in the vehicle to the image display device after the power supply of the vehicle changes from the on state to the off state when a determination result of the control unit indicates that the abnormality has occurred in the vehicle, and the transmission unit transmits the position information detected by the position detection unit to the image display device after the power supply of the vehicle changes from the on state to the off state when the determination result of the control unit indicates that no abnormality has occurred in the vehicle.

2. The vehicle according to claim 1, further comprising:
   a timer unit configured to continue supply of power to the detection unit, the transmission unit, and the control unit for a predetermined time after the power supply of the vehicle changes from the on state to the off state, wherein the control unit transmits the information to the image display device for a period in which the power is supplied from the timer unit after the power supply of the vehicle changes from the on state to the off state.

3. The vehicle according to claim 1,
wherein the detection unit includes at least one of a tilt detection unit configured to detect tilt of the vehicle, a vibration/impact detection unit configured to detect vibration or an impact of the vehicle, a rotation angle detection unit configured to detect a rotation angle of the vehicle, a key detection unit configured to detect whether a key is stuck in the vehicle, an air pressure detection unit configured to detect an air pressure of a wheel tire in the vehicle, a remaining amount detection unit configured to detect a remaining amount of fuel or battery of the vehicle, and a cover opening/closing detection unit configured to detect an opened/closed state of a cover of a seat of the vehicle, and
wherein the control unit determines whether the abnormality has occurred in the vehicle using at least one of results of detections performed by the tilt detection unit, the vibration/impact detection unit, the rotation angle detection unit, the key detection unit, the air pressure detection unit, the remaining amount detection unit, and the cover opening/closing detection unit.

4. The vehicle according to claim 1,
wherein the image display device is at least one of a head-mounted display, a smartphone, a tablet terminal, and a portable game device, and
wherein the image display device includes: a reception unit configured to receive information from the transmission unit of the vehicle; and a second notification unit configured to provide a notification according to the information received by the reception unit.

5. A vehicle control method, comprising:
a detection procedure of detecting a state of a vehicle and position information of the vehicle;
a transmission procedure of transmitting information based on a result of the detection performed in the detection procedure to an image display device;
an image change procedure of changing information to be transmitted to the image display device when a power supply of the vehicle has changed from an on state to an off state;
a determination procedure of determining whether an abnormality has occurred in the vehicle using the result of the detection performed in the detection procedure when it is determined that the power supply of the vehicle is in the off state; and
a transmission procedure of transmitting the position information detected in the detection procedure and information indicating that the abnormality has occurred in the vehicle to the image display device after the power supply of the vehicle changes from the on state to the off state when a determination result of the determination procedure indicates that the abnormality has occurred in the vehicle, and transmits the position information detected in the detection procedure to the image display device after the power supply of the vehicle changes from the on state to the off state when the determination result of the determination procedure indicates that no abnormality has occurred in the vehicle.

* * * * *